United States Patent
Goinski

(10) Patent No.: US 7,287,976 B2
(45) Date of Patent: Oct. 30, 2007

(54) TOOL INSERT FOR THE GATE OF A HOT-CHANNEL NOZZLE FOR AN INJECTION MOLDING MACHINE

(75) Inventor: Michael Goinski, Rimpar (DE)

(73) Assignee: Incoe Corporation, Troy, MI (US)

( * ) Notice: Subject to any disclaimer, the term of this patent is extended or adjusted under 35 U.S.C. 154(b) by 317 days.

(21) Appl. No.: 10/904,663

(22) Filed: Nov. 22, 2004

(65) Prior Publication Data

US 2005/0191383 A1 Sep. 1, 2005

(30) Foreign Application Priority Data

Feb. 28, 2004 (DE) ............... 10 2004 009 799

(51) Int. Cl.
*B29C 45/18* (2006.01)
(52) U.S. Cl. ............... 425/549; 425/572; 425/588
(58) Field of Classification Search ........ 425/572, 425/588, 549
See application file for complete search history.

(56) References Cited

U.S. PATENT DOCUMENTS 2,339,443 A * 1/1944 Wilson ............... 425/577
4,666,396 A * 5/1987 Shaw ............... 425/549

* cited by examiner

*Primary Examiner*—Tim Heitbrink
(74) *Attorney, Agent, or Firm*—John A. Artz; Dickinson Wright PLLC

(57) ABSTRACT

Tool insert for the gate of a hot-channel nozzle for an injection molding machine, which tool insert connects to the front (tool-side) part of the hot-channel nozzle and in turn is capable of insertion into a corresponding recess of the tool. The tool insert consists of a front cylindrical fitting piece with flow channel and an accommodating head for the nozzle. The accommodating head is provided at its (per se cylindrical) outer surface with one or more projections capable of cutting, which in the radial direction have an extension that is greater than the radius of the accommodating bore provided in the tool for accommodation of the accommodating head of the tool insert. The projections capable of cutting are designed in such a way that, upon insertion of the tool insert into the said accommodating bore of the tool, a guide grooves are cut into the inner surface of the accommodating bore in the tool.

12 Claims, 1 Drawing Sheet

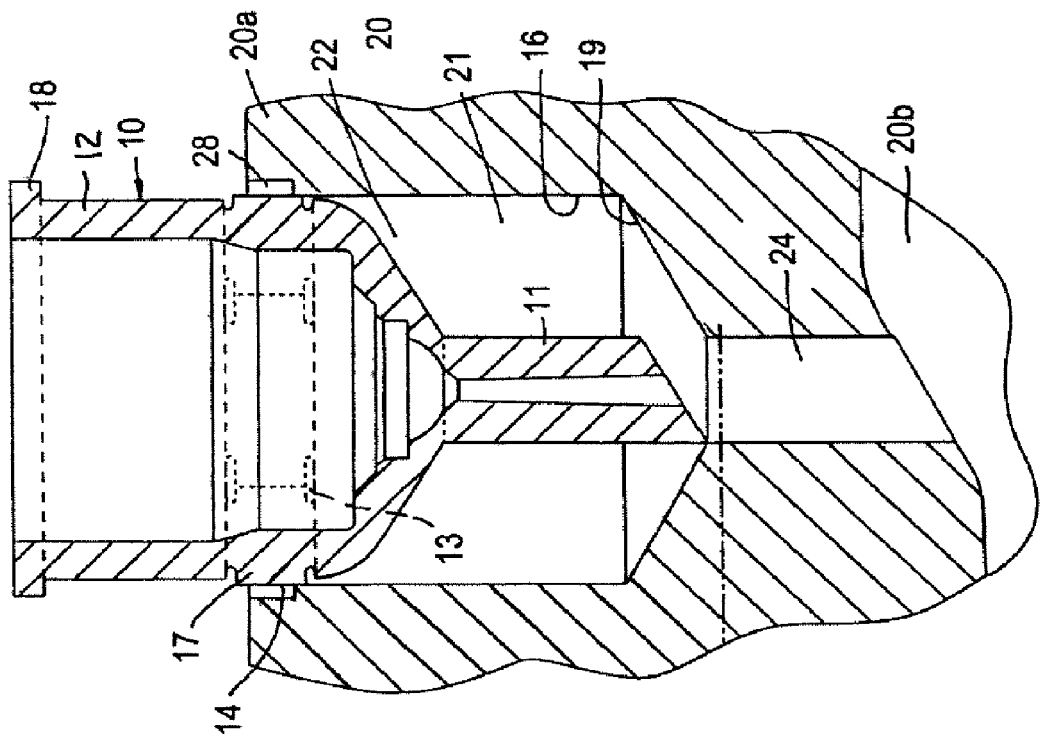
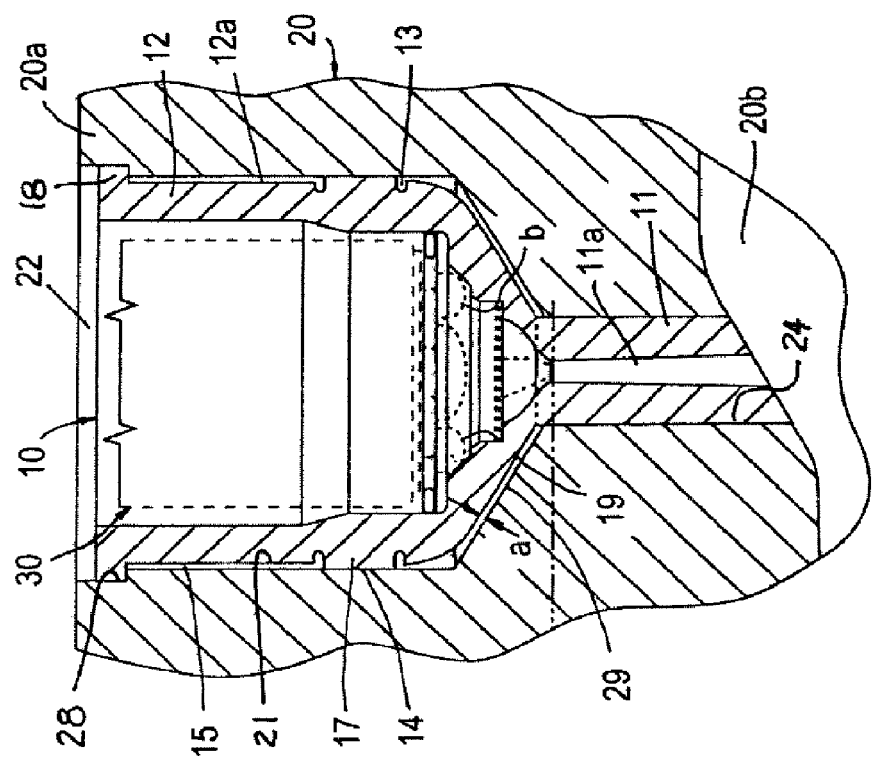

TOOL INSERT FOR THE GATE OF A HOT-CHANNEL NOZZLE FOR AN INJECTION MOLDING MACHINE

TECHNICAL FIELD

The present invention relates to a tool insert for the gate of a hot-channel nozzle for an injection molding machine.

BACKGROUND

In injection molding, hot melt is injected into the tool (injection mold) by an injection molding machine either directly or via a hot-channel distribution system by means of a hot-channel nozzle. The tool consists of an injection side, accommodating the hot-channel nozzle, in which the outer mold (cavity) of the part of synthetic material is as a rule located, and an ejection side with the inner mold (core). The region in which the hot-channel nozzle connects to the tool and to the part of synthetic material is called the "gate." In injection molding, the front, tool-side part of the hot-channel nozzle with the gate region is inserted into a recess of the tool. In the rear region, the nozzle is supported axially on the hot channel distribution block and is fixed in the tool with the front gate part by precision sealing. There, the nozzle is exposed to severe mechanical and thermal stresses. Since the gate region of the nozzle consequently is subject to rapid wear, it is not designed as an integral part of the hot-channel nozzle, but as a replaceable tool insert.

The connection of the tool insert to the nozzle and to the tool may be designed in a variety of ways. The extent of work for the toolmaker is variable, depending upon the accomplishment. In addition, the necessary thermal separation between nozzle and tool plays an important role in these accomplishments. After conclusion of the actual injection process, the melt injected into the tool should solidify rapidly, while the melt retained in the nozzle tip should remain liquid. This means that a temperature difference of about 200° C. must be obtained between the two regions mentioned.

A known embodiment of the tool insert consists in that it is capable of being screwed into the front (tool-side) end of the nozzle. This accomplishment requires the least work by the toolmaker. He need only insert the nozzle bore mass into the tool and provide a fitting bore for the gate region. The disadvantage of this accomplishment consists in that, for one thing, owing to screwing of the tool insert into the nozzle, undesirable good thermal conduction from the nozzle shaft to the front of the tool insert takes place. An additional disadvantage of this accomplishment is that, owing to heating of the hot-channel distribution block into which the nozzle shafts are screwed, and heating of the nozzles, thermal variations in position result, which negatively influence the precise position of the nozzles and the tool inserts screwed into them in regard to the tool. A third disadvantage is that the front contact surface between the tool insert and the cavity of the tool is not axially symmetrical but, for example, is designed beveled. In this case, the nozzle must be introduced into the fitting bore of the tool with the tool insert in a precise angular position about its longitudinal axis. With regard to the required tight screwed joint between tool insert and nozzle, on the one hand, and nozzle shaft and hot-channel distribution block on the other, this is in practice not achievable after renewed assembly and disassembly has taken place with such screwing actions.

A second known accomplishment consists, instead of a separate tool insert, of working the gate region directly into the tool. Here, positioning and thermal separation can be obtained in good fashion. However, the disadvantage of this accomplishment is the high cost of fabrication for the toolmaker. He must work hemispherical surfaces, conical surfaces, shoulders and a variety of fits into the tool. An additional disadvantage of this accomplishment consists in that, upon wear of the gate, the entire injection-side of the tool or individual cavities must be replaced or repaired.

In a third known accomplishment, the extent of work for the toolmaker is reduced as compared with the said second accomplishment, in that the gate is produced by an insert in the tool. In this accomplishment, thermal separation is good, and a specified angular position can be obtained by a device securing against rotation. In case of wear, the tool insert can simply be replaced by a fresh tool insert. But the work for the toolmaker in this accomplishment is also greater than in the accomplishment first mentioned.

SUMMARY OF THE INVENTION

An object of the present invention is to develop a tool insert of the type mentioned above which is procured in such a way that the connection work to be performed on the tool by the toolmaker is small and simple, that good thermal separation between tool insert and tool is obtained and, where required, a specific angular position of the tool insert is simply adjustable in exact fashion and this position is also reproducible without any problem upon renewed insertion of the tool insert.

To accomplish this object, a tool insert for the gate of a hot-channel nozzle for an injection molding machine is provided. The tool insert connects to the front (tool-side) part of the hot-channel nozzle and in turn is capable of insertion into a corresponding recess of the tool. The tool insert consists of a front cylindrical fitting piece with a flow channel and an accommodating head for the nozzle. The accommodating head is provided at its (per se cylindrical) outer surface with one or more projections capable of cutting. The projection(s) in the radial direction have extensions that are greater than the radius of the accommodating bore provided in the tool for accommodation of the accommodating head of the tool insert. The projection or projections capable of cutting are designed such that upon insertion of the tool insert into the said accommodating bore of the tool, guide grooves are cut into the inner surface of the accommodating bore in the tool.

The tool insert according to the invention combines not only the advantages of the three known accomplishments mentioned above, but goes beyond them. For producing the nozzle bore mass, the toolmaker need only introduce two bores and one fit into the tool. These comprise all the work needed for the nozzle and the tool insert. Thermal separation is optimal, and the tool insert may if necessary be removed and reintroduced or replaced by another tool insert in exactly the same angular position. Should for any reason the same or some other tool insert be installed in another position of angular rotation, additional guide grooves can be cut into the inner surface of the accommodating bore of the tool upon insertion of the tool insert.

BRIEF DESCRIPTION OF THE DRAWINGS

The invention is to be described in detail by means of the exemplary embodiment shown in the figures, wherein:

FIG. 1 shows an exemplary embodiment of a tool insert according to the invention, inserted into a tool.

FIG. 2 illustrates the tool insert shown in FIG. 1 during its insertion into the accommodating recess of the tool.

DESCRIPTION OF THE PREFERRED EMBODIMENTS

In FIG. 1, a section in the injection side of the tool is labeled 20. 20a designates the wall of the injection side of the tool and 20b the cavity. The tool insert 10 consists of a cylindrical fitting piece 111 with flow channel 11a for the melt and an accommodating head 12 for accommodation of the nozzle 30, indicated by broken lines. In the tool itself is found a recess 21, which consists of a fitting bore 24 (FIG. 2) for accommodation of the fitting piece 111 and an accommodating bore 22 for accommodation of the accommodating head 12 of the tool insert. The seal between nozzle 30 and tool insert is effected via the cylindrical surfaces of the nozzle 30, designated by b in FIG. 1, and tool insert 10.

The exemplary embodiment of the tool insert shown is provided on its per se cylindrical outer surface 12a of the accommodating head 12 with a regular hexagon 17. The diameter of this hexagon between two diametrically opposite corners of the hexagon is somewhat greater than the diameter of the accommodating bore 22 of the tool. This means that when the tool insert is inserted into the tool recess 21 for the first time, the corner edges of the hexagon running in the longitudinal direction of the nozzle penetrate into the material of the tool and in so doing cut or broach guide grooves 15 into the wall 16 of the accommodating bore 22. For accommodation of the resulting chips, groove-like recesses 13 are provided in the corner regions of the hexagon 17 at the axial upper and lower ends of the hexagon. If, after its removal, such a tool insert is reinserted or replaced by a fresh one, the required angular position is exactly specified by the guide grooves 15 already cut in.

The axial end position of the tool insert in the tool is determined by the cooperation of a flange 18 at the end of the tool insert turned away from the tool and by the depth of a correspondingly sized, widened shoulder 28 at the entrance of the tool recess 21. This end position is selected in such a way that upon rest of the flange 18 on the widened shoulder 28, a certain distance "a" (FIG. 1) remains present between the front region 19 of the tool insert and the floor 29 of the accommodating bore 22. Owing to this, good thermal separation on the one hand and, on the other, statically determined rest of the tool insert in the tool recess 21 is obtained.

The seat between the fitting piece 111 and the associated accommodating bore 24 of the tool is so firm that, after penetration of the fitting piece 111 into the accommodating bore 24, rotation of the tool insert is no longer possible.

When the transition between the fitting piece 111 and the cavity is not axially symmetrical with respect to the longitudinal axis of the hot-channel nozzle, as is represented in the figures, the tool insert must be positioned in a definite angular position in the tool recess 21. For this reason, the axial position of the hexagon 17 on the tool insert is selected so that at the beginning of the cutting operation, i.e., when upon insertion of the tool insert into the recess 21 of the hexagon 17, the floor of the shoulder 28 is reached, the fitting piece 11 is still not forced into the associated accommodating bore 24. This insertion moment is represented in FIG. 2. In this situation, the tool insert can be rotated into the desired angular position without any difficulty. After that, pressing in and cutting of the guide grooves 15 are effected.

It is understood that the regular hexagon 17 shown in the figures may be replaced by any other regular or irregular polygon. In principle, the inventive idea is already implemented by a single projection, capable of cutting and designed in any way whatsoever, on the outer surface 12a of the accommodating head 12, which in the radial direction has an extension that is greater than the radius of the accommodating bore 22 in the tool 20, so that upon insertion of the tool insert 10 into the tool recess 21 a guide groove 15 can be cut into the inner surface 16 of the accommodating bore 22.

If a plurality of projections 14 capable of cutting is provided, these preferably are arranged uniformly distributed over the periphery of the accommodating head 12.

While particular embodiments of the invention have been shown and described, numerous variations and alternative embodiments will occur to those skilled in the art. Accordingly, it is intended that the invention be limited only in terms of the appended claims.

What is claimed is:

1. A tool insert for a gate of a hot-channel nozzle for an injection molding machine, said tool insert connecting to the front portion of a hot-channel nozzle, said nozzle being capable of insertion into a corresponding recess in the tool insert, said tool insert comprising a front cylindrical fitting piece with a flow channel therethrough and an accommodating head member, said accommodating head member having an outer surface and at least one cutting projection on said outer surface, said cutting projection extending in the radial direction greater than the radius of an accommodating bore provided in the tool for accommodation of said accommodating head member, said cutting projection capable of forming a guide groove in the inner surface of the accommodating base upon insertion of said tool insert into the accommodating bore.

2. The tool insert according to claim 1, wherein a plurality of cutting projections are uniformly distributed over the periphery of the accommodating head member.

3. The tool insert according to either of claim 1, wherein a plurality of cutting projections are provided and are formed by an axial section of the accommodating head member being designed as a polygon, where the radial extensions of the corners of the polygon are greater than the radius of the accommodating bore provided in the tool for accommodation of the accommodating head member of the tool insert and in that the axial edges of the polygon form the said cutting projections.

4. The tool insert according to either of claim 2, wherein said plurality of cutting projections are formed by an axial section of the accommodating head member being designed as a polygon, where the radial extensions of the corners of the polygon are greater than the radius of the accommodating bore provided in the tool for accommodation of the accommodating head member of the tool insert and in that the axial edges of the polygon form the said cutting projections.

5. The tool insert according to claim 3, wherein the polygon is a regular hexagon.

6. The tool insert according to claim 4, wherein the polygon is a regular hexagon.

7. The tool insert according to claim 1 wherein the axial position of the cutting projections is selected so that, upon insertion of the tool insert into the accommodating bore for the accommodating head member of the tool insert, the cutting operation begins before the cylindrical fitting piece penetrates into the associated accommodating bore in the tool.

8. The tool insert according to claim 2 wherein the axial position of the cutting projections is selected so that, upon insertion of the tool insert into the accommodating bore for the accommodating head member of the tool insert, the cutting operation begins before the cylindrical fitting piece penetrates into the associated accommodating bore in the tool.

9. The tool insert according to claim 1 wherein the axial end position of said tool insert in the tool recess is dependent upon the cooperation of a flange on the end of the tool insert turned away from the tool with a corresponding widened shoulder at the entrance of the tool recess.

10. The tool insert according to claim 2 wherein the axial end position of the tool insert in the tool recess is dependent upon the cooperation of a flange on the end of said tool insert turned away from the tool with a corresponding widened shoulder at the entrance of said tool recess.

11. The tool insert according to claim 9, wherein the said axial end position is selected so that the front region of the accommodating head member directed toward the tool does not touch the floor of the accommodating bore.

12. The tool insert according to claim 10, wherein the said axial end position is selected so that the front region of the accommodating head member directed toward the tool does not touch the floor of the accommodating bore.

* * * * *